(12) United States Patent
Ganiger et al.

(10) Patent No.: US 11,674,399 B2
(45) Date of Patent: Jun. 13, 2023

(54) AIRFOIL ARRANGEMENT FOR A GAS TURBINE ENGINE UTILIZING A SHAPE MEMORY ALLOY

(71) Applicant: General Electric Company, Schenectady, NY (US)

(72) Inventors: Ravindra Shankar Ganiger, Bangalore (IN); Praveen Sharma, Bangalore (IN); Abhijeet Jayshingrao Yadav, Karad (IN); Nitesh Jain, Bangalore (IN); Nicholas Joseph Kray, Mason, OH (US)

(73) Assignee: General Electric Company, Schenectady, NY (US)

( * ) Notice: Subject to any disclaimer, the term of this patent is extended or adjusted under 35 U.S.C. 154(b) by 22 days.

(21) Appl. No.: 17/368,961

(22) Filed: Jul. 7, 2021

(65) Prior Publication Data
US 2023/0008743 A1 Jan. 12, 2023

(51) Int. Cl.
*F01D 5/28* (2006.01)
*F01D 5/14* (2006.01)
*F01D 5/30* (2006.01)

(52) U.S. Cl.
CPC .............. *F01D 5/282* (2013.01); *F01D 5/147* (2013.01); *F01D 5/30* (2013.01); *F05C 2251/08* (2013.01); *F05D 2240/303* (2013.01); *F05D 2240/304* (2013.01); *F05D 2240/307* (2013.01); *F05D 2300/505* (2013.01)

(58) Field of Classification Search
CPC .............. F01D 5/147; F01D 5/282; F01D 5/30
See application file for complete search history.

(56) References Cited

U.S. PATENT DOCUMENTS

| | | |
|---|---|---|
| 4,022,540 A | 5/1977 | Young |
| 4,111,600 A | 9/1978 | Rothman et al. |
| 4,971,641 A | 11/1990 | Nelson et al. |
| 5,112,194 A | 5/1992 | More |
| 5,123,813 A | 6/1992 | Przytulski et al. |
| 5,129,787 A | 7/1992 | Violette et al. |
| 5,141,400 A | 8/1992 | Murphy et al. |
| 5,222,297 A | 6/1993 | Graff et al. |
| 5,269,658 A | 12/1993 | Carlson et al. |
| 5,392,514 A | 2/1995 | Cook et al. |
| 5,449,273 A | 9/1995 | Hertel et al. |
| 5,486,096 A | 1/1996 | Hertel et al. |
| 5,520,532 A | 5/1996 | Reinfelder et al. |
| 5,580,217 A | 12/1996 | Richards et al. |
| 5,836,744 A | 11/1998 | Zipps et al. |
| 5,843,354 A | 12/1998 | Evans et al. |
| 5,844,669 A | 12/1998 | Wang et al. |

(Continued)

FOREIGN PATENT DOCUMENTS

| | | |
|---|---|---|
| CN | 102400718 | 4/2012 |
| CN | 103628923 B | 3/2016 |

(Continued)

*Primary Examiner* — Topaz L. Elliott
*Assistant Examiner* — Cameron A Corday
(74) *Attorney, Agent, or Firm* — Dority & Manning, P.A.

(57) ABSTRACT

An airfoil arrangement for a gas turbine engine may include a support device using a shape memory alloy to support and control the airfoil. The support device may be formed as part of a fan blade. The arrangement may be configured to reduce overall weight and dimensions of the gas turbine engine.

19 Claims, 6 Drawing Sheets

(56) References Cited

U.S. PATENT DOCUMENTS

| | | |
|---|---|---|
| 5,908,285 A | 6/1999 | Graff |
| 5,935,360 A | 8/1999 | Griggs |
| 5,939,006 A | 8/1999 | Wang et al. |
| 6,146,099 A | 11/2000 | Zipps et al. |
| 6,260,567 B1 | 7/2001 | Gruensfelder et al. |
| 6,290,895 B1 | 9/2001 | Wang et al. |
| 6,294,113 B1 | 9/2001 | Woodmansee et al. |
| 6,431,837 B1 | 8/2002 | Velicki |
| 6,543,992 B2 | 4/2003 | Webster |
| 6,588,709 B1 | 7/2003 | Dunne et al. |
| 6,718,752 B2 | 4/2004 | Nesbitt et al. |
| 6,796,408 B2 | 9/2004 | Sherwin et al. |
| 6,843,565 B2 | 1/2005 | Evans et al. |
| 6,886,622 B2 | 5/2005 | Villhard |
| 7,114,912 B2 | 10/2006 | Gerez et al. |
| 7,198,454 B2 | 4/2007 | Evans |
| 7,216,831 B2 | 5/2007 | Wood |
| 7,367,776 B2 | 5/2008 | Albers et al. |
| 7,546,727 B2 | 6/2009 | White |
| 7,644,575 B2 | 1/2010 | Wood et al. |
| 7,736,130 B2 | 6/2010 | Schilling et al. |
| 7,744,092 B2 | 6/2010 | Mortzheim |
| 7,837,446 B2 | 11/2010 | McMillan |
| 7,883,049 B2 | 2/2011 | Nesbitt et al. |
| 7,972,109 B2 | 7/2011 | Crall et al. |
| 8,011,882 B2 | 9/2011 | McMillan |
| 8,038,408 B2 | 10/2011 | McMillan |
| 8,087,617 B2 | 1/2012 | Sclafani et al. |
| 8,100,662 B2 | 1/2012 | Schreiber |
| 8,109,734 B2 | 2/2012 | Backhouse |
| 8,142,141 B2 | 3/2012 | Tesh et al. |
| 8,146,250 B2 | 4/2012 | Moroso |
| 8,251,640 B2 | 8/2012 | Beckford et al. |
| 8,277,172 B2 | 10/2012 | Tesh et al. |
| 8,434,293 B2 | 5/2013 | Widdle, Jr. et al. |
| 8,573,936 B2 | 11/2013 | Lafont |
| 8,651,142 B2 | 2/2014 | Sellers et al. |
| 8,974,884 B2 | 3/2015 | Fabre et al. |
| 9,127,558 B2 | 9/2015 | Soundiramourty et al. |
| 9,169,741 B2 | 10/2015 | Szwedowicz et al. |
| 9,581,145 B2 | 2/2017 | Jasklowski |
| 9,810,236 B2 | 11/2017 | Chelf |
| 9,878,501 B2 | 1/2018 | Zatorski et al. |
| 9,963,988 B2 | 5/2018 | Swedowicz et al. |
| 10,029,781 B2 | 7/2018 | Bigbee-Hansen et al. |
| 10,041,355 B2 | 8/2018 | Hussain et al. |
| 2007/0202296 A1 | 8/2007 | Chandrasekaran et al. |
| 2008/0273983 A1 | 11/2008 | Clark et al. |
| 2009/0035131 A1 | 2/2009 | McMillan |
| 2009/0269203 A1 | 10/2009 | Care et al. |
| 2010/0054937 A1 | 3/2010 | Beckford et al. |
| 2010/0150707 A1 | 6/2010 | Jevons |
| 2010/0296942 A1 | 11/2010 | Jevons |
| 2011/0023301 A1 | 2/2011 | Jones |
| 2011/0027096 A1 | 2/2011 | Northfield |
| 2011/0049297 A1 | 3/2011 | Jevons et al. |
| 2011/0052405 A1 | 3/2011 | Parkin |
| 2011/0129351 A1 | 6/2011 | Das et al. |
| 2011/0182743 A1 | 7/2011 | Naik |
| 2011/0194941 A1 | 8/2011 | Parkin et al. |
| 2011/0217160 A1 | 9/2011 | McMillan |
| 2011/0223027 A1 | 9/2011 | Klinetob et al. |
| 2012/0003100 A1 | 1/2012 | James et al. |
| 2012/0021243 A1 | 1/2012 | Kray et al. |
| 2012/0028055 A1 | 2/2012 | Schmidt |
| 2012/0034089 A1 | 2/2012 | Wadewitz et al. |
| 2012/0051935 A1 | 3/2012 | Naik et al. |
| 2012/0082556 A1 | 4/2012 | Macchia et al. |
| 2012/0100006 A1 | 4/2012 | Merriman et al. |
| 2015/0218953 A1 | 8/2015 | Bottome |
| 2017/0226867 A1 | 8/2017 | Nandula et al. |
| 2017/0254208 A1* | 9/2017 | Prince .................... F01D 5/282 |
| 2017/0321714 A1 | 11/2017 | Jain et al. |
| 2017/0370376 A1 | 12/2017 | Kray et al. |
| 2018/0105257 A1 | 4/2018 | Bernhardt et al. |
| 2018/0162541 A1 | 6/2018 | Jasklowski et al. |
| 2018/0223861 A1 | 8/2018 | Chelf |
| 2020/0200018 A1* | 6/2020 | Ganiger ................ F01D 5/282 |

FOREIGN PATENT DOCUMENTS

| | | |
|---|---|---|
| EP | 0526057 A1 | 2/1993 |
| EP | 1752610 A2 | 2/2007 |
| EP | 2159378 A2 | 3/2010 |
| EP | 1920895 B1 | 10/2010 |
| EP | 2236235 A1 | 10/2010 |
| EP | 2458153 A2 | 5/2012 |
| FR | 2953225 A1 | 6/2011 |
| GB | 2430472 A | 3/2007 |
| GB | 2450139 A | 12/2008 |
| WO | WO2008122751 A2 | 10/2008 |
| WO | WO2010014342 A1 | 2/2010 |

\* cited by examiner

AIRFOIL ARRANGEMENT FOR A GAS TURBINE ENGINE UTILIZING A SHAPE MEMORY ALLOY

FIELD

The present disclosure relates to an airfoil arrangement for a gas turbine engine.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly. The turbomachine may include a spool arrangement. For example, the spool arrangement may include a high pressure, high speed spool and a low pressure, low speed spool. A combustion section of the turbomachine receives pressurized air, which is mixed with fuel and combusted within a combustion chamber to generate combustion gases. The combustion gases are provided to the spool arrangement. For example, the combustion gases may be provided first to a high pressure turbine of the high pressure spool, driving the high pressure spool, and subsequently to a low speed turbine of the low speed spool, driving the low speed spool.

In a turbofan engine, the fan assembly generally includes a fan and a fan casing. The fan generally includes a plurality of airfoils or fan blades extending radially outwardly from a central hub and/or a disk. During certain operations, the fan blades of the fan may rub against or otherwise contact the fan casing, transferring a load to the fan casing and causing damage to the fan blades, the fan casing, or both.

In certain configurations, the fan casing may include a honeycomb material or trench-filler material configured to mitigate load transfer to and through the fan casing. However, this approach is generally costly. Furthermore, this approach may result in larger, heavier, and/or less efficient fan casings.

As such, there is a need for an improved airfoil that reduces load transfer to the fan casing when the rotor blades rub against the fan casing.

BRIEF DESCRIPTION OF THE DRAWINGS

Other aspects and advantages of the embodiments disclosed herein will become apparent upon consideration of the following detailed description, wherein similar or identical structures may have similar or identical reference numerals.

DETAILED DESCRIPTION

Figure 1:
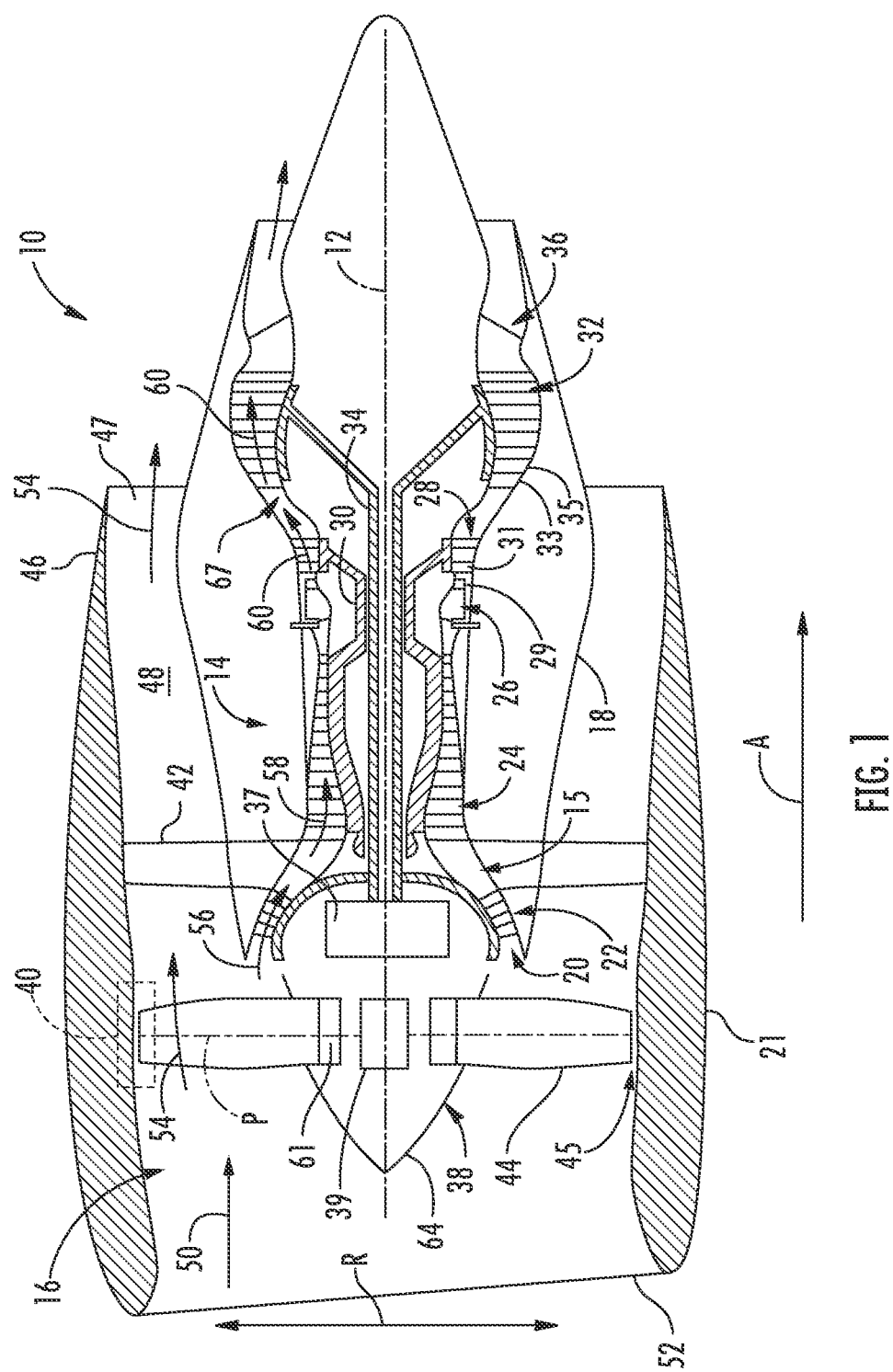
FIG. 1 is a sectional view of a gas turbine engine.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In some embodiments, one or more components of the gas turbine engine described hereinbelow may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein enable the production of airfoils, turbine vanes and rotors, compressor vanes and rotors, and/or fan blades. Such components may have unique features, configurations, thicknesses, materials, densities, fluid passageways, headers, and mounting structures that may not have been possible or practical using prior manufacturing methods. Some of these features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

In a gas turbine engine, the fan assembly is generally connected to the spool arrangement. For example, the rotor of the fan assembly may be coupled to the low speed spool. The fan assembly functions to displace air towards the turbomachine. A portion of the air from the fan assembly enters into the turbomachine to move through at least one stage of compression and another portion of air bypasses at least a portion of the turbomachine. Air initially bypassing the turbomachine may enter the turbomachine at a stage further from the fan assembly and air initially entering the turbomachine may bypass further stages of the turbomachine.

Rotation of the rotor serves to accelerate air with the airfoils of the fan towards the turbomachine. The fan casing extends around radially distal ends of the airfoils and may be used to increase performance by reducing blade tip losses. Performance of the fan assembly generally requires maintaining very small clearances between the fan and the fan casing.

To achieve high performance, tips of the airfoils rotate passing very close to the fan casing. During some events, for example foreign object ingestion into the gas turbine engine, the airfoils may contact the fan casing. In some of these events, the blades may be released from the engine in a scenario known as fan blade out ("FBO"). This scenario poses a threat to the gas turbine engine and its surroundings.

An object of this disclosure is to describe various airfoil arrangements to manage adverse events such as foreign object ingestion. Airfoils of a fan assembly may be configured with a support device utilizing a shape memory alloy to support and control an airfoil in these events. The described airfoil arrangements may advantageously provide a reliable, lightweight, and compact configuration to manage these adverse events and to reduce and control FBO events.

To mitigate damage and potentially reduce the need for immediate repair, some fan assemblies are equipped with abradable material. For example, abradable material may be provided on the airfoils and/or an interior of the fan casing. The fan casing may be provided with a trench circumferentially arranged on the interior of the fan casing and generally aligned with the rotation of the fan. Abradable trench filler may be positioned inside the trench and configured to dissipate some of the impact energy from contact of the fan and fan casing. Such configurations can require increased weight and space to effectively manage these events.

A clearance device for an airfoil may be provided, for example to enable a controlled and consistent mode of maintaining clearance between the airfoil and the fan casing that may enable reducing cost and weight and load transfer to a surrounding casing. The airfoil may define a tip portion, a root portion, and an intermediate portion between the tip portion and the root portion. The intermediate portion may include the clearance device or a portion of the clearance device. In some embodiments, the clearance device may extend into some or all of the tip and/or root portions. The root portion may extend between the intermediate portion and an airfoil root along a span S. The tip portion may extend between the intermediate portion and an airfoil tip along the span S. One or more transition portions may be provided. For example, a root transition portion may be provided between the intermediate portion and the root portion. A tip transition portion may be provided between the intermediate portion and the tip portion. The one or more transition portions may be configured to include the intermediate portion and at least one of the root portion and the tip portion. For example, a transition portion may define an overlap between the intermediate portion and another portion. In an embodiment, the tip transition portion defines an overlap along an airfoil thickness of the tip portion and the intermediate portion. In another embodiment, the root transition portion defines an overlap along the airfoil thickness of the root portion and the intermediate portion.

The embodiments generally shown and described herein may enable a controlled and consistent span reduction of the airfoil, such as a fan blade, following a damage event, such as a hard rub against a surrounding fan casing. These embodiments enable the airfoil to fold and/or contract at a desired span of the airfoil, for example to mitigate load transfer to a surrounding casing. These embodiments may further enable the airfoil to fold and/or contract such that excessive or extreme unbalance of the fan may be reduced following a damage event, such as airfoil liberation, foreign object damage (e.g., bird strikes, icing, etc.), or loss of lubrication or damping to a bearing assembly.

Referring now to the Drawings, FIG. 1 is a sectional schematic view of an embodiment of a gas turbine engine 10. The shown embodiment may be used within an aircraft in accordance with aspects of the present subject matter. More particularly, for the embodiment of FIG. 1, the gas turbine engine is a high-bypass turbofan jet engine, with the gas turbine engine 10 being shown having a longitudinal or axial centerline axis 12 extending therethrough along an axial direction A for reference purposes. The gas turbine engine 10 further defines a radial direction R extended from the centerline 12. Although an exemplary turbofan embodiment is shown, it is anticipated that the present disclosure may be equally applicable to turbomachinery in general, such as an open rotor, a turboshaft, turbojet, or a turboprop configuration, including marine and industrial turbine engines and auxiliary power units.

In general, the gas turbine engine 10 includes a turbomachine (indicated generally by reference character 14) and a fan assembly 16 positioned upstream thereof. The turbomachine 14 may include an outer casing 18. The outer casing 18 may be of a substantially tubular configuration and/or may define an annular inlet 20. In addition, the outer casing 18 may further enclose and support a low pressure ("LP") compressor 22 for increasing the pressure of the air that enters the turbomachine 14 to a first pressure level. A high pressure ("HP") compressor may be included. For example, a multi-stage, axial-flow configuration of the HP compressor 24 may receive the pressurized air from the LP compressor 22 and further increase the pressure of such air.

The pressurized air exiting the HP compressor 24 may flow to a combustor 26 within which fuel is injected into the flow of pressurized air, with the resulting mixture being combusted within the combustor 26. Combustion products 60 may be directed from the combustor 26 along a hot gas path 67 of the gas turbine engine 10 to a high pressure ("HP") turbine 28 for driving the HP compressor 24 via a high pressure ("HP") shaft or spool 30. The combustion products 60 may also flow to a low pressure ("LP") turbine 32 for driving the LP compressor 22. The LP turbine 32 may also drive the fan assembly 16. For example, the LP turbine 32 may drive the LP compressor 22 and/or the fan assembly 16 via a low pressure ("LP") shaft or spool 34. The LP shaft 34 may be generally coaxial with the HP shaft 30. After driving the turbines 28 and 32, the combustion products 60 may be expelled from the turbomachine 14 via an exhaust nozzle 36 which may provide propulsive jet thrust.

The turbine sections of the gas turbine engine 10 may include one or more non-rotatable components. For example, the HP turbine 28 may include a plurality of HP turbine stator vanes 29. The LP turbine may include a plurality of LP turbine stator vanes 33. The HP turbine stator vanes 29 and LP turbine stator vanes may be configured to span the hot gas path 67 in the radial direction R. The HP turbine stator vanes 29 and LP turbine stator vanes may be non-rotatable about the longitudinal centerline axis 12 relative to the outer casing 18 and may be used to support the outer casing 18. The HP turbine stator vanes 29 and LP turbine stator vanes 33 may be tuned or tunable to increase the performance of the gas turbine engine 10 by controlling flow speed and pressure.

The turbine sections of the gas turbine engine 10 may include a plurality of rotor blades. For example, the HP turbine 28 may include a plurality of HP turbine rotor blades 31. The LP turbine 32 may include a plurality of LP turbine rotor blades 35. The HP turbine rotor blades 31 and LP turbine rotor blades 35 may be rotatable relative to the outer casing 18. Relative rotation between the HP turbine stator vanes 29 and the HP turbine rotor blades 31 and between the LP turbine stator vanes 33 and the LP turbine rotor blades 35 may be tuned or tunable. For example, pitches of the HP turbine stator vanes 29, HP turbine rotor blades 31, LP turbine stator vanes 33, and/or LP turbine rotor blades may be adjusted or adjustable to optimize flow through the hot gas path 67.

The performance of the gas turbine engine 10 may be increased by minimizing clearances between components such as vanes and blades and ducting components rotatable relative thereto. For example, minimizing and maintaining a clearance between the turbine rotor blades 31, 35 and the outer casing 18 may be used to increase engine performance. Minimizing and maintaining a clearance between the turbine stator vanes 29, 33 and a rotatable component such as the LP shaft or spool 34 or a component coupled thereto may also be used to increase engine performance.

Figure 2:
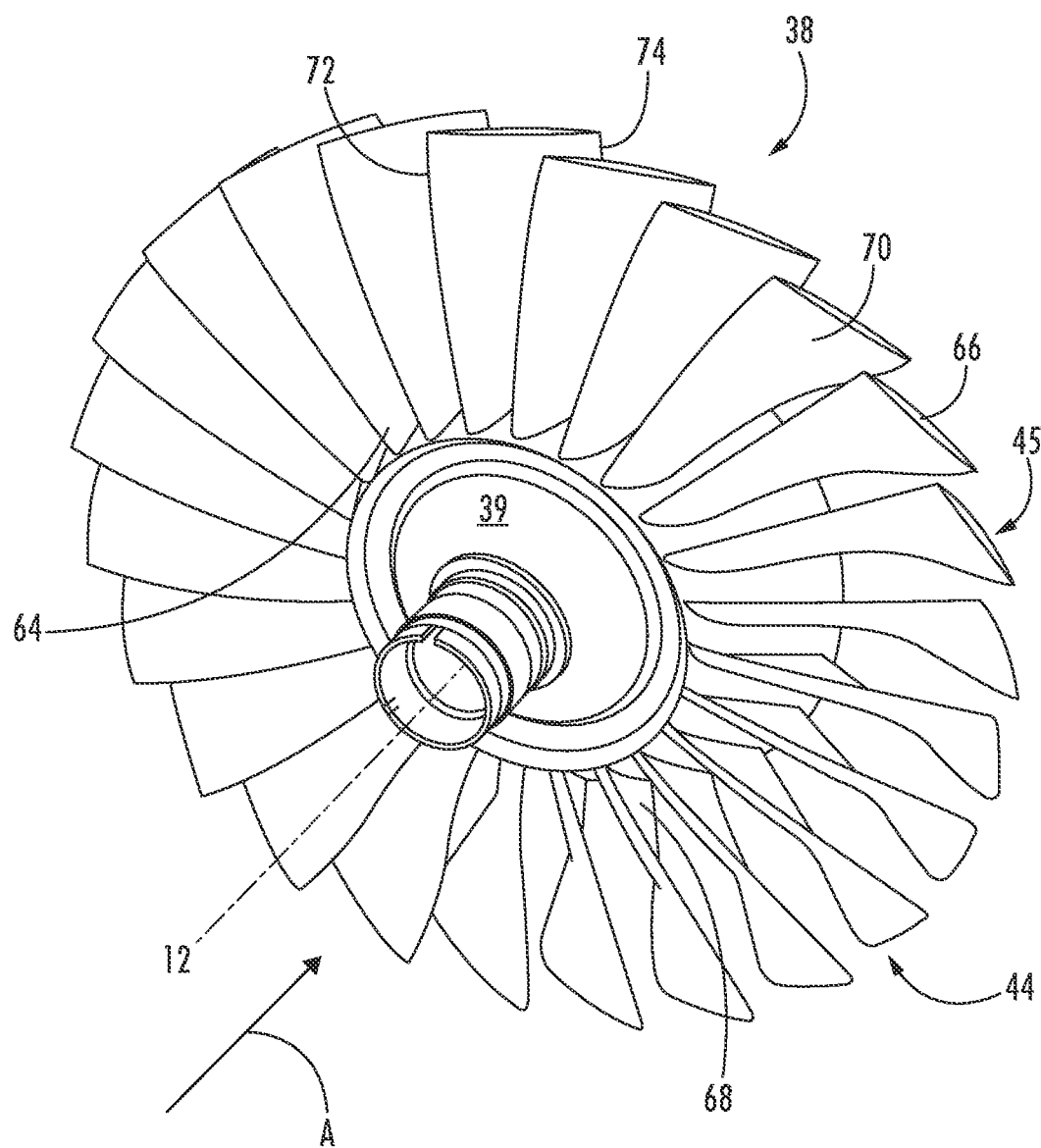
FIG. 2 is a perspective view of a fan assembly for a gas turbine engine.

As shown in FIGS. 1 and 2, the fan assembly 16 of the gas turbine engine 10 may include a fan rotor 38. For example, a rotatable, axial-flow configuration of the fan rotor 38 may configured to be surrounded or ducted by a fan casing 40. In some embodiments, the LP shaft 34 may be connected directly to the fan rotor 38 and/or the rotor disk 64, such as in a direct-drive configuration. In some configurations, the LP shaft 34 may be connected to the fan rotor 38 via a speed reduction device 37 such as a reduction gear gearbox in an indirect-drive or geared-drive configuration. The speed reduction device 37 may be included between any suitable shafts/spools within the gas turbine engine 10 as desired or required.

It should be appreciated by those of ordinary skill in the art that the fan casing 40 may be configured to be supported relative to the turbomachine 14. For example, the fan casing 40 may be supported by a plurality of substantially radially-extending, circumferentially-spaced supports. In an embodiment, a plurality of outlet guide vanes 42 are provided as such supports. As such, the fan casing 40 may enclose the fan rotor 38. The fan casing may include an outer nacelle 21, which may be configured for aerodynamic flight properties such as drag reduction. The fan rotor 38 may be connected to a plurality of fan blades 44. For example, a disk 64 may be provided for coupling to the plurality of fan blades 44. Moreover, a downstream portion 46 of the fan casing 40 may extend over an outer portion of the turbomachine 14 to define an airflow conduit 48. The airflow conduit 48 may be configured as a secondary, or by-pass, airflow conduit. The airflow conduit 48 may be configured to provide additional propulsive jet thrust and/or may be used to effect cooling of the gas turbine engine 10, for example using a fan nozzle 47.

A hub 65 may be provided to cover the disk 64. For example, the hub 65 may be rotatable with the disk 64 and aerodynamically contoured to control airflow through the plurality of fan blades 44.

A pitch change mechanism ("PCM") 61 may be provided. For example, the PCM 61 may be operatively coupled to the plurality of fan blades 44 and configured to vary the pitch of at least some of the fan blades. Individual fan blades 44 may be rotatable relative to the disk 39 about a pitch axis P and controlled by the PCM 61. The PCM 61 may be configured to vary the pitch of fan blades 44 individually or in unison.

It will be appreciated, however, that the gas turbine engine 10 is provided by way of example only. In other exemplary embodiments, the gas turbine engine 10 may have any other suitable configuration. For example, in other exemplary embodiments, the gas turbine engine 10 may include a fixed-pitch fan, may be configured as a direct drive engine (i.e., may not include the gearbox 37), may include any suitable or desired number or configuration of shafts or spools, compressors, and/or turbines, etc.

Referring still to FIG. 1, during operation of the gas turbine engine 10, it should be appreciated that an initial airflow 50 may enter the gas turbine engine 10 through an initial inlet 52 of the fan casing 40. The initial airflow 50 may then pass through the fan blades 44. Downstream of the fan blades 44, the initial airflow 50 may be divided. For example, the initial airflow 50 may be split into a first compressed airflow 54 that moves through the airflow conduit 48 and a second compressed airflow 56 that enters the LP compressor 22. The second compressed airflow 56 may travel along a core air flow path 15. The pressure of the second compressed airflow 56 may then be increased as it enters the HP compressor 24 as a third compressed airflow 58. After mixing with fuel and being combusted within the combustor 26, the combustion products 60 may exit the combustor 26 and flow through the HP turbine 28. Thereafter, the combustion products 60 may flow through the LP turbine 32 and exit the exhaust nozzle 36 to provide thrust for the gas turbine engine 10.

Figure 3:
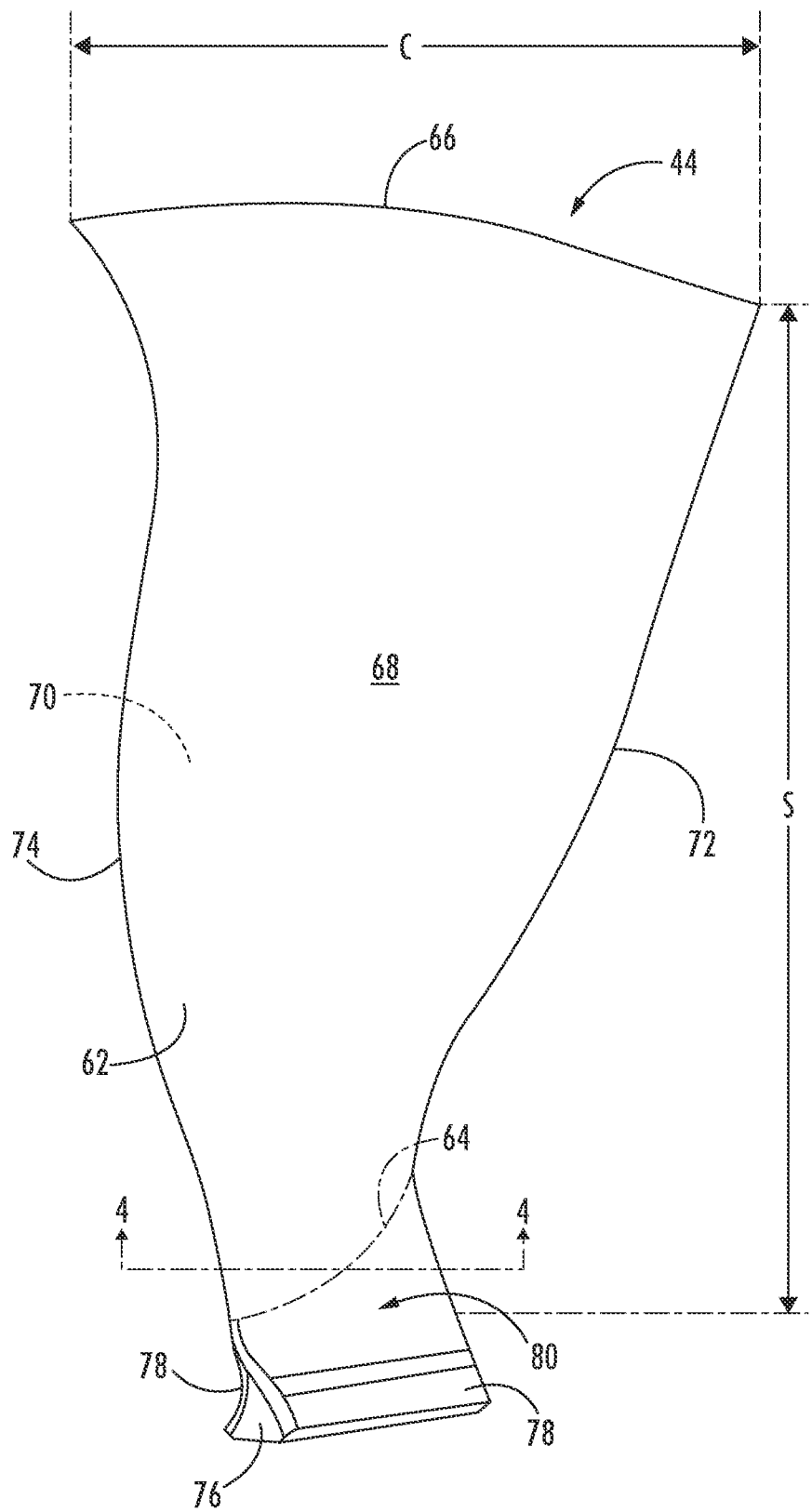
FIG. 3 is a perspective view of a fan blade for a gas turbine engine.

Referring now to FIGS. 2 and 3, exemplary airfoil 62 embodiments are provided in the context of a fan blade 44. FIG. 2 as above depicts componentry of the fan assembly 16. FIG. 3 depicts an individual fan blade 44 for use in a fan assembly 16. Although the illustrated airfoils 62 are shown as part of a fan blade 44, it is understood that the following discussion of an airfoil 62 may be equally applied to another airfoil embodiment, e.g., a stator vane or rotor blade of a compressor 22, 24 and/or turbine 28, 32 (see FIG. 1). As shown, each fan blade 44 extends radially outwardly along a span S defining a spanwise direction from an airfoil root 64 to an airfoil tip 66. The span S is defined by a distance in the spanwise direction along a span centerline of the fan blade 44 from the airfoil root 64 to the airfoil tip 66. A pressure side 68 and a suction side 70 of the airfoil 62 extend from a leading edge 72 to a trailing edge 74 of the fan blade 44 and between the airfoil root 64 and airfoil tip 66 along the span S. Further, it should be recognized that the airfoil 62 may define a chordwise direction along a chord C at each point along the span S and extending between the leading edge 72 and the trailing edge 74. The chord C is defined by a distance in the chordwise direction along a chord centerline, the chord centerline generally being orthogonal to the span centerline of the fan blade 44 from the leading edge 72 to the trailing edge 74 Further, the chord C may vary along the span S of the airfoil 62. For instance, in the depicted embodiment, the chord C increases along the span S toward the airfoil tip 66. Though, in other embodiments, the chord C may be approximately constant throughout the span S or may decrease from the airfoil root 64 to the airfoil tip 66.

As shown particularly in FIG. 3, the airfoil 62 may define a thickness extending between the pressure side 68 and the suction side 70 at each point along the span S in a thickness direction T. In certain embodiments, the thickness may be approximately constant throughout the span S of the airfoil 62. In other embodiments, the airfoil 62 may define a variable thickness between the airfoil root 64 and the airfoil tip 66. For instance, the thickness may generally decrease along the span S toward the airfoil tip 66. Additionally, the airfoil 62 may define an approximately constant thickness along the chord C at each point along the span S. Or, in other embodiments, at least one point along the span S of the airfoil 62 may define a variable thickness along the chord C. For instance, the airfoil 62 may define a maximum thickness at a position along the chord C at each point along the span S.

The airfoil 62 may also include a plurality of surfaces. For example, the airfoil 62 may include a first outer surface, a second outer surface opposite the first outer surface, and a support device 84 formed of a shape memory alloy disposed between the first outer surface and the second outer surface. The first outer surface may be, for example, the pressure side 68 of the airfoil 62 and the second outer surface may be the suction side 70 of the airfoil 62 as shown in FIGS. 2 and 3. The support device 84 may be enclosed within a shell formed at least in part by the first outer surface, the second outer surface, a leading edge 72 surface connecting the first and second outer surfaces, and a trailing edge 74 surface spaced apart from the leading edge surface and connecting the first and second outer surfaces.

The fan blade 44 of FIG. 3 may have a hollow configuration. In another example, the fan blade 44 may include one or more cavities for purposes such as cooling. Alternatively, the fan blade 44 may be of solid construction.

For the embodiment shown, each fan blade 44 includes an integral component having an axial dovetail 76 with a pair of opposed pressure faces 78 leading to a transition section 80. When mounted within the fan rotor disk 39, as illustrated in FIG. 2, the dovetail 76 is disposed in a dovetail slot of the fan rotor disk 39, thereby attaching the fan blades 44 as part of the fan rotor 38.

In an embodiment, the airfoil 62 may include at least one composite ply (such as one of the plies 82 shown in FIG. 7, described below). For instance, the airfoil 62 may be formed at least partially from a ceramic matrix composite. More particularly, in certain embodiments, the airfoil 62 may be formed in part from one or more composite plies 82 configured as ceramic matrix composite prepreg plies.

Composite materials may include, but are not limited to, metal matrix composites (MMCs), polymer matrix composites (PMCs), or ceramic matrix composites (CMCs). Composite materials, such as may be utilized in the airfoil 62, generally include a fibrous reinforcement material embedded in matrix material, such as polymer, ceramic, or metal material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as the composite plies 82) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

The airfoil 62 may include various metallic components. For example, the leading edge 72, trailing edge 74, tip 66, and/or root 64 may be formed of at least one metal layer. For example, reinforcement and/or impact resistant features may be provided in these components of the airfoil 62. These reinforcement and/or impact resistant features may be manufactured from a metal, such as titanium. The titanium may be a titanium alloy such as Ti—6Al—4V. Alternatively, iron alloys, steel, and/or aluminum alloys may be provided. For example, the reinforcement and/or impact resistant features may be manufactured from a stainless steel such as 15-5 PH.

The gas turbine engine 10 may include a support device 84 configured to support another component. For example, a support device 84 may be provided to support and control deflection of a component of the gas turbine engine 10 such as an airfoil 62. Such an airfoil 62 may be provided on various components of the gas turbine engine 10. For example, one or more of turbine rotor blades 31, 35; turbine stator vanes 29, 33; and/or fan blades 44 may be provided with such a support device 84.

Figure 4:
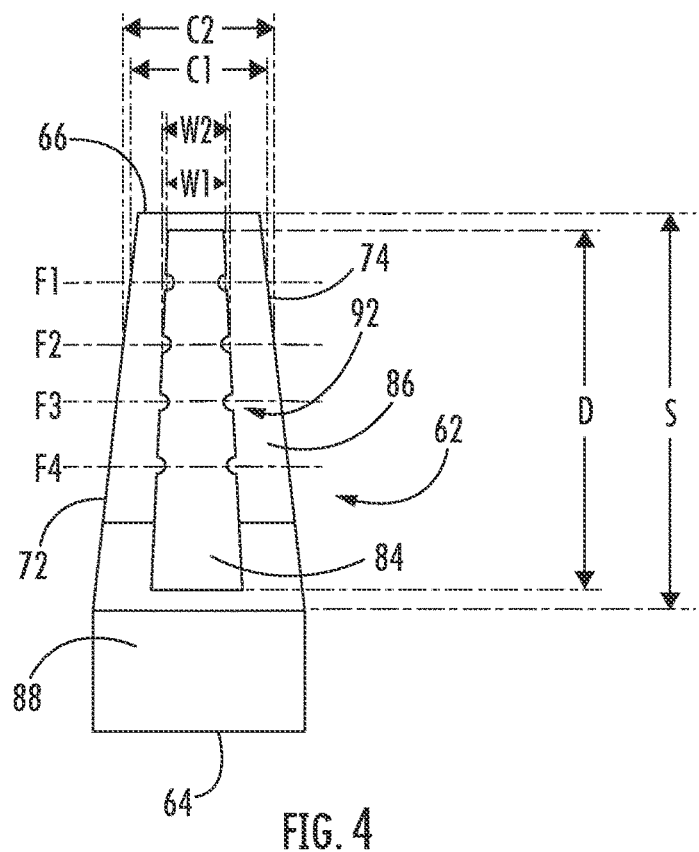
FIG. 4 is a schematic sectional view of an embodiment of a fan blade for a gas turbine engine.

More specifically, referring now to FIG. 4, a schematic, cross-sectional view of an airfoil 62 is provided having a support device 84 included therewith. The support device 84 may be manufactured using a shape memory alloy ("SMA"). The support device 84 may include one or more SMA components or features or may be entirely formed of SMA.

A shape memory alloy as described with reference to the support device 84 may be a metal alloy that experiences a temperature-related, solid-state, micro-structural phase change. This configuration of the support device 84 may facilitate a change from one physical shape to another physical shape. The temperature at which a phase change occurs generally is called the critical or transition temperature of the alloy. The support device 84 may be constructed of various SMA materials. For example, the support device 84 may include a titanium nickel alloy frequently called Nitinol alloy. The support device 84 may alternatively or additionally include a high temperature type of SMA. For example, the support device 84 may be constructed of alloys of Ru alloyed with Nb or Ta. In an embodiment, high temperature SMA may facilitate the support device 84 to develop shape memory transition temperatures ranging between about 20 degrees Celsius and about 1400 degrees Celsius. The transition temperature of the support device 84 may be tunable to specific applications. For example, a support device 84 employed in a fan blade may benefit from a relatively low transition temperature whereas a support device 84 employed in an HP turbine rotor blade 31 may benefit from a relatively high transition temperature.

In some embodiments, support device 84 may include the SMA material as a major constituent, in an amount greater than 50 weight percent ("wt. %") of the support device 84. In certain embodiments, the support device 84 may be essentially composed of the SMA material (e.g., at least 90 wt. %, such as at least 95 wt. %, such as 100 wt. %). A SMA material is generally an alloy capable of returning to its original shape after being deformed. For instance, SMA materials may define a hysteresis effect where the loading path on a stress-strain graph is distinct from the unloading path on the stress-strain graph. Thus, SMA materials may provide improved hysteresis damping as compared to traditional elastic materials. Further, SMA materials may act as a lightweight, solid-state alternative to traditional actuators. For instance, certain SMA materials may be heated in order to return a deformed SMA to its pre-deformed shape. A SMA material may also provide varying stiffness, in a pre-determined manner, in response to certain ranges of temperatures. The change in stiffness of the shape memory alloy is due to a temperature related, solid state microstructural phase change that enables the alloy to change from one physical shape to another physical shape. The changes in stiffness of the SMA material may be developed by working and annealing a preform of the alloy at or above a temperature at which the solid state micro-structural phase change of the shape memory alloy occurs. The temperature at which such phase change occurs is generally referred to as the critical temperature or transition temperature of the alloy. In the manufacture of a support device 84 comprising SMA (also referred to as an SMA support device 84) intended to change stiffness during operation gas turbine engine 10, the support device 84 may be formed to have one operative stiffness (e.g., a first stiffness) below a transition temperature and have another stiffness (e.g., a second stiffness) at or above the transition temperature.

Some shape memory alloys used herein are characterized by a temperature-dependent phase change. These phases include a martensite phase and an austenite phase. The martensite phase generally refers to a lower temperature phase. Whereas the austenite phase generally refers to a higher temperature phase. The martensite phase is generally more deformable, while the austenite phase is generally less deformable. When the shape memory alloy is in the martensite phase and is heated to above a certain temperature, the shape memory alloy begins to change into the austenite phase. The temperature at which this phenomenon starts is referred to as the austenite start temperature (As). The temperature at which this phenomenon is completed is called the austenite finish temperature (Af). When the shape memory alloy, which is in the austenite phase, is cooled, it begins to transform into the martensite phase. The temperature at which this transformation starts is referred to as the martensite start temperature (Ms). The temperature at which the transformation to martensite phase is completed is called the martensite finish temperature (Mf). As used herein, the term "transition temperature" without any further qualifiers may refer to any of the martensite transition temperature and austenite transition temperature. Further, "below transition temperature" without the qualifier of "start temperature" or "finish temperature" generally refers to the temperature that is lower than the martensite finish temperature, and the "above transition temperature" without the qualifier of "start temperature" or "finish temperature" generally refers to the temperature that is greater than the austenite finish temperature.

In some embodiments, a support device 84 comprising SMA may define a first stiffness at a first temperature and define a second stiffness at a second temperature, wherein the second temperature is different from the first temperature. Further, in some embodiments, one of the first temperature or the second temperature is below the transition temperature and the other one may be at or above the transition temperature. Thus, in some embodiments, the first temperature may be below the transition temperature and the second temperature may be at or above the transition temperature. While in some other embodiments, the first temperature may be at or above the transition temperature and the second temperature may be below the transition temperature. Further, various embodiments of SMA support devices 84 described herein may be configured to have different first stiffnesses and different second stiffnesses at the same first and second temperatures.

Non-limiting examples of SMAs that may be suitable for forming various embodiments of the SMA support device 84 described herein may include nickel-titanium (NiTi) and other nickel-titanium based alloys such as nickel-titanium hydrogen fluoride (NiTiHf) and nickel-titanium palladium (NiTiPd). However, it should be appreciated that other SMA materials may be equally applicable to the current disclosure. For instance, in certain embodiments, the SMA material may include a nickel-aluminum based alloys, copper-aluminum-nickel alloy, or alloys containing zinc, zirconium, copper, gold, platinum, and/or iron. The alloy composition may be selected to provide the desired stiffness effect for the application such as, but not limited to, damping ability, transformation temperature and strain, the strain hysteresis, yield strength (of martensite and austenite phases), resistance to oxidation and hot corrosion, ability to change shape through repeated cycles, capability to exhibit one-way or two-way shape memory effect, and/or a number of other engineering design criteria. Suitable shape memory alloy compositions that may be employed with the embodiments of present disclosure may include, but are not limited to NiTi, NiTiHf, NiTiPt, NiTiPd, NiTiCu, NiTiNb, NiTiVd, TiNb, CuAlBe, CuZnAl and some ferrous based alloys. In some embodiments, NiTi alloys having transition temperatures between 5° C. and 150° C. are used. NiTi alloys may change from austenite to martensite upon cooling.

Moreover, SMA materials may also display superelasticity. Superelasticity may generally be characterized by recovery of large strains, potentially with some dissipation. For instance, martensite and austenite phases of the SMA material may respond to mechanical stress as well as temperature induced phase transformations. For example, SMAs may be loaded in an austenite phase (i.e. above a certain temperature). As such, the material may begin to transform into the (twinned) martensite phase when a critical stress is reached. Upon continued loading and assuming isothermal conditions, the (twinned) martensite may begin to detwin, allowing the material to undergo plastic deformation. If the unloading happens before plasticity, the martensite may generally transform back to austenite, and the material may recover its original shape by developing a hysteresis.

Referring still to FIG. 4, it will be appreciated that the airfoil 62 may be incorporated into the fan blade 44 of FIG. 3. For example, FIG. 4 depicts the airfoil 62 as a component including the aerodynamic working surfaces of the fan blade 44.

FIG. 4 depicts a schematic, cross-sectional view of the fan blade 44 of FIG. 3, including the support device 84. As is depicted, the support device 84 is enclosed at least partially within the fan blade 44. For example, although not depicted, the support device 84 may include a coating or other separate layer that is bonded to another portion of the fan blade 44. Regardless, the support device 84 may be inserted inside the fan blade 44 during manufacturing or assembly of the fan blade 44, or may be embedded in the fan blade 44 during formation of the fan blade 44.

Referring still to FIG. 4, the airfoil 62 includes a frangible portion 86. The frangible portion 86 is configured to selectively fracture, disintegrate, or otherwise lose mass. For example, the frangible portion 86 of the fan blade 44 may be configured to preferentially fracture upon contact with the fan casing 40. In this manner, it may be possible to avoid or minimize the use of protective barriers or abradable material, such as trench filler, in the fan casing 40. Specific configurations of the support device 84, alone or in combination with a frangible portion 86 may facilitate such weigh saving configurations.

The frangible portion 86 is disposed outward of the root portion in the radial direction R. For example, in the exemplary embodiment depicted in FIG. 4, the frangible portion 86 makes up at least part of the tip 66 of an airfoil 62. In an embodiment, an entire external surface of the tip 66 is composed of the frangible portion 86. The frangible portion 86 may be substantially surrounding at least a portion of the support device 84. In an embodiment, the frangible portion 86 is configured to permanently deform responsive to an external load.

Referring still to FIG. 4, the support device 84 is configured to connect two or more components of the fan blade 44. For example, in the embodiment depicted, the support device 84 extends through and connects the root portion to the frangible portion 86. The root portion of the airfoil 62 may be configured to selectively maintain structural integrity. For example, the frangible portion 86 may not extend to the root portion. The support device 84 may be permanently attached to both the body portion 88 and the frangible portion 86. For example, the support device 84 may be embedded in the body portion and the frangible portion 86.

The support device 84 may be movable between a baseline position and a deflected position. For example, an airfoil 62 including the support device 84 may be disturbed or impacted such that the support device 84 is deflected. In this manner, a support device 84 may take advantage of advantageous properties of its shape memory alloy construction as described above. An embodiment of an airfoil 62 configured with a support device 84 can be shown in FIG. 3. The deflection of the airfoil 62 may be directly translated to deflection of the support device 84 into its deflected position. A deflection zone 90 may be defined in one or more components. This deflection zone may be defined across the chord C of a fan blade 44. In some embodiments, the support device 84 may be configured to control deflection to one or more staged deflection portions or folding portions as will be described in more detail with reference to FIGS. 4-6 below.

The support device 84 may be disposed within the frangible portion 86. For example, the support device 84 may be entirely encased in the frangible portion 86. The support device 84 may also be integral with the frangible portion 86. For example, the support device 84 may be co-molded with the frangible portion 86. It should be appreciated that the support device 84 and the frangible portion 86 may be manufactured in the same process or in distinct processes. In an embodiment, one or both of the support device 84 and the frangible portion 86 are additively manufactured.

Figure 5:
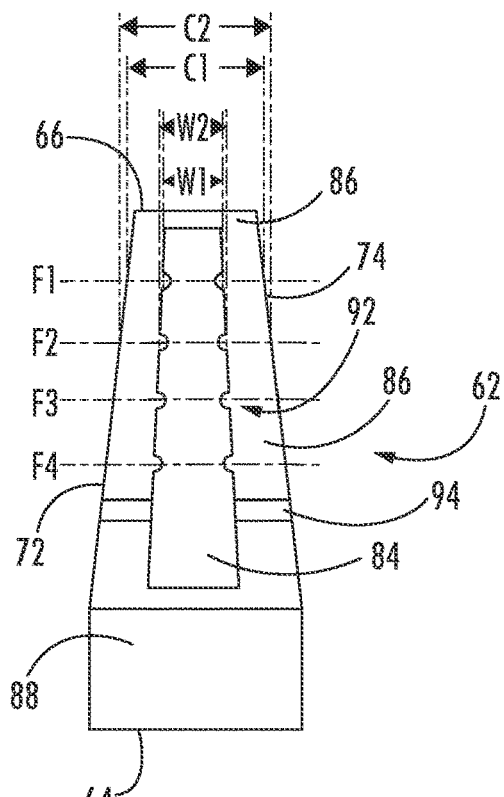
FIG. 5 is a schematic sectional view of an embodiment of a fan blade for a gas turbine engine.
Figure 6:
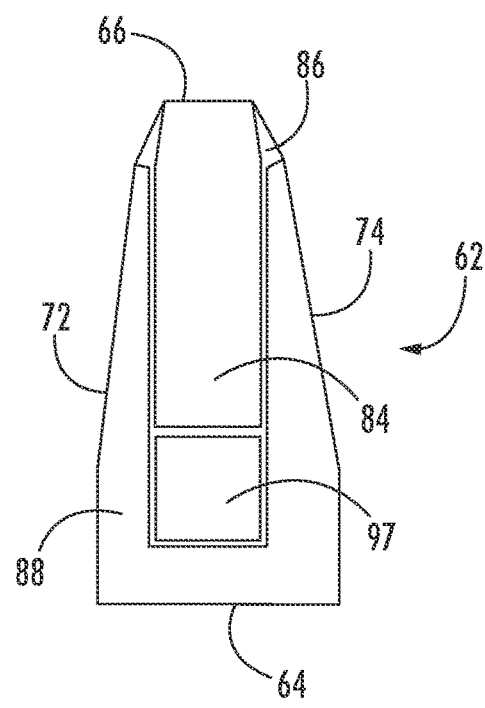
FIG. 6 is a schematic sectional view of an embodiment of a fan blade for a gas turbine engine.

Referring still to FIG. 4-6 the support device 84 further includes at least one folding portion F1-F4 configured to deform in the axial direction A. More specifically, the folding portions are configured to allow an outer portion of the fan blade 44 along the radial direction R to pivot or bend at the folding portion relative to an inner portion of the fan blade 44 along the radial direction R. For example, in the case of foreign object ingestion, the support device 84 may be deflected with the airfoil 62 of a fan blade 44 towards the turbomachine 14. In an embodiment, the deformation is temporary. For example, an SMA support device 84 may enable a return to a non-deformed state with a phase change.

The support device 84 may be configured with a deformation threshold. For example, the support device 84 may be tuned to resist folding in certain situations. In an embodiment, the support device 84 is tuned to remain in the non-deformed state during crosswind, light rub, and/or small to medium flocking bird impact. The support device 84 may be tuned using shape memory alloys to have a relatively small deflection during light impact events below the deformation threshold and to have a relatively large deflection during heavy impact events above the deformation threshold. The deflection of the support device 84 may be non-linear relative to impact force, for example having a disproportionately greater deflection per unit force above the deformation threshold. In such a way, the support device 84 may deflect within a small range of distances below the deformation threshold and may deflect within a large range of values above the deformation threshold.

The at least one folding portion F1-F4 may be configured to induce deflection, deformation, and/or folding in various ways. For example, the at least one folding portion F1-F4 may be configured as a structurally weak point in the support device 84. In an embodiment, one or more recess 92 is provided along a perimeter of the support device 84 to at least in part form the at least one folding portion F1-F4. Alternatively or additionally, the support device 84 may be formed of a thinner material at the at least one folding portion F1-F4 and/or the material properties may be configured for local structural weakness relative to adjacent portions of the support device 84.

The at least one folding portion F1-F4 may be a plurality of folding portions. Each of the plurality of folding portions F1-F4 may be spaced apart along the span S of an airfoil 62 and/or fan blade 44. In an embodiment, each of the folding portions F1-F4 is configured identically.

The plurality of folding portions F1-F4 may include a first folding portion F1 and a second folding portion F2 disposed between the root 64 of an airfoil 62 and the first folding portion F1. A third folding portion F3 and a fourth folding portion F4 may further be provided disposed between the root 64 and the second folding portion. Subsequent folding portions F1-F4 may be formed to resist folding to a greater degree than previous folding portions F1 disposed further outward in the radial direction R. For example, the second folding portion F2 may be configured to resist folding to a greater degree than the first folding portion F1. In an embodiment, the support device 84 tapers so that it is thinner across the chord C of an airfoil as it approaches the tip. Such a configuration may naturally promote the above differences in relative resistance to folding. For example, the first folding portion F1 may define a first foldable width W1 along the chord C of an airfoil 62 and the second folding portion F2 may define a second foldable width W2 along the chord C, the second foldable width being greater than the first foldable width.

The folding portions F1-F4 may be configured in various ways to achieve relative stiffnesses. For example, as shown in FIGS. 4 and 5, the at least one folding portion F1-F4 may be configured with a recess 92. In an embodiment, the at least one folding portion F1-F4 is configured as at least one recess 92 in the support device 84. In another embodiment, opposed pairs of recesses 92 may be provided across the chord C of the support device. For example, each of the plurality of foldable portions F1-F4 may include a pair of recesses 92 in the support device 84. Although the recesses 92 are depicted as curved or radiused recesses, it should be appreciated that other configurations of recesses may be employed. For example, one or more recesses 92 may be angular or polygonal in configuration. Alternatively or additionally to the recesses 92, other features may be employed to facilitate folding. For example, a local reduction in thickness, perforation, or tuned material properties may be used to facilitate folding.

The support device 84 may be configured to undergo a phase transformation responsive to an adverse event. For example, the support device 84 may undergo a phase transformation to a martensite phase responsive to an external load. The support device 84 may also be configured to return to an austenite phase responsive to relaxing of the external load. The transition temperature may be a tunable feature to correspond with temperature conditions of the gas turbine engine. For example, during takeoff and high power events, components of the gas turbine engine will experience relatively high temperatures compared to cruising or low power events.

In various embodiments, a transition temperature of the support device 84 may be tuned or tunable for the intended use. For example, the transition temperature may be tuned to fall between temperature ranges experienced by the support device 84 in low power events and high power events. In an embodiment, the support device 84 is configured for use in a fan blade 44 with a transition temperature of at least one hundred degrees Celsius (100° C.). In another embodiment, the support device 84 is configured for use in a fan blade 44 with a transition temperature of between twenty and one hundred degrees Celsius (20-100° C.). In other embodiments, the transition temperature may be much higher. For example, in embodiments where the support device 84 is configured for use in a HP turbine rotor blade 31, the transition temperature may be between a five hundred and one thousand degrees Celsius (500-1000° C.) or may be greater than one thousand degrees Celsius (1000° C.)

The support device 84 may be configured to extend over various dimensions of an airfoil 62. For example, the support device 84 may extend over 5%, 10%, 25%, 50%, or 75% of the span S of an airfoil 62. As shown in FIG. 4, the support device 84 may be defined with a support device length D. The support device 84 may also extend over 5%, 10%, 25%, 50%, or 75% of the chord of an airfoil 62. Also as shown in FIG. 4, the support device 84 may be defined with one or more support device widths C1, C2. The support device widths C1, C2 can be compared with the first and second foldable widths W1, W2 for the purposes of determining relative widths. In an embodiment, a section of the support device 84 extends over at least fifty percent (50%) of the span S. In an embodiment, a section of the support device 84 extends over at least fifty percent (50%) of the chord C.

A shape memory alloy component may be configured to deform to reduce the span S of an airfoil. For example, the support device 84 formed of SMA may be used to reduce the span S through deformation towards the turbomachine 14 as described above. The support device 84 may be completely formed of SMA or may be partially formed of SMA.

The support device 84 may additionally or alternatively be configured to regulate a mass release event of the frangible portion 86. In an embodiment, the support device 84 is configured at least in part to maintain integrity while the frangible portion 86 loses mass. Alternatively or in combination with this embodiment, the support device 84 may be configured to fracture with the frangible portion 86. For example, the support device 84 may include one or more frangible portions configured to selectively fracture with an amount of the frangible portion 86.

The frangible tip portion 86 may be disposed between the root 64 and the tip 66 of fan blade 44 as depicted. In this arrangement, as shown in the embodiments of FIGS. 4 and 5, the tip 66 is defined as the radially outermost point of the frangible tip portion. As shown, the support device 84 connects the root 64 and the frangible portion 86.

It should be appreciated that in other embodiments, the fan blade 44 may be configured in any other suitable manner. For example, referring now to FIG. 5, a cross-sectional schematic view is provided in accordance with another embodiment of the present disclosure. As shown, an intermediate portion 94 is provided in the fan blade 44. In the depicted embodiment, the intermediate portion 94 is disposed between the root portion and the frangible tip portion. The intermediate portion 94 may include various materials. For example, the intermediate portion 94 may be formed of a shape memory alloy. The intermediate portion 94 may be configured to facilitate local deformation or elasticity, for example to allow local bending, compression, and/or expansion.

Referring to FIG. 6, the airfoil 62 may also be configured with an axial spring 97. As shown in FIG. 6, the axial spring 97 is provided inboard of the support device 84 in the radial direction R. In an embodiment, the axial spring 97 is compressible to facilitate movement of the support device 84 and thus reduction of the span S of the airfoil 92. The axial spring 97 may be formed of SMA in the various ways described above with reference to the support device 84. A configuration employing the axial spring 97 may also include a frangible portion 86 as described above. The axial spring 97 may be configured to facilitate movement of at least part of the airfoil 62 radially inwards towards the axial centerline 12. For example, the axial spring 97 may deform to facilitate radially inward movement of the support device 84.

Figure 7:
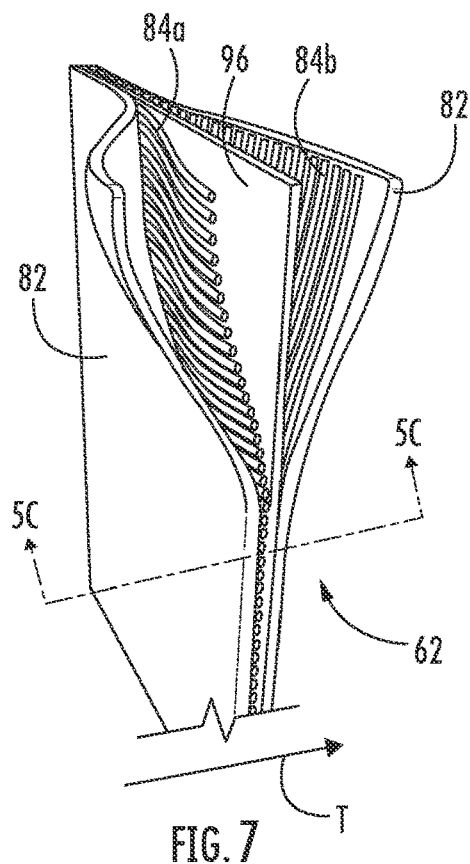
FIG. 7 is a schematic view of separated components of an airfoil for a gas turbine engine.

FIG. 7 depicts a schematic view of a partially disassembled airfoil 62. As shown, an airfoil 62 may be provided with a component separating at least part of the support device 84. For example, an intermediate component 96 is shown as provided between a plurality of layers of the support device 84. For example, the support device 84 may include a first support device layer 84a and a second support device layer 84b. The intermediate component 96 may be disposed between the first and second support device layers 84a, 84b. The intermediate component 96 may include various materials. For example, the intermediate component 96 may be formed of an epoxy resin or polymer material such as a polyurethane filler material.

Figure 8:
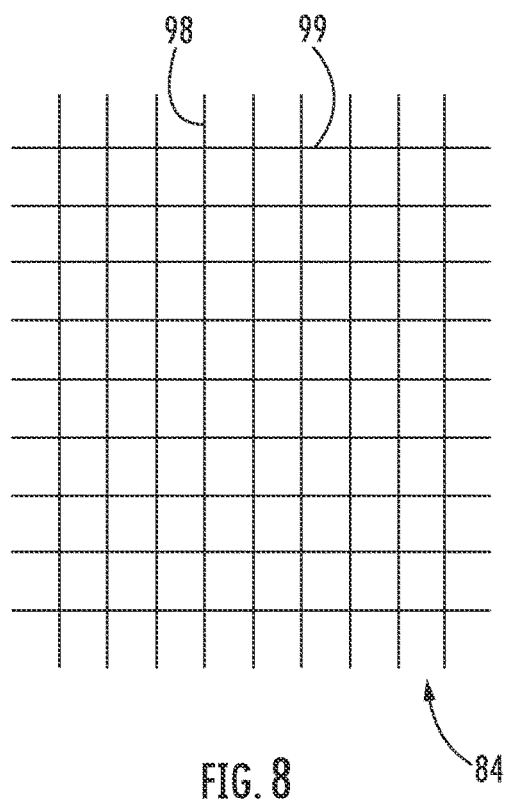
FIG. 8 is a schematic view of a matrix arrangement for a component of a gas turbine engine.

The support device layers 84a, 84b may be configured in various ways as described above with reference to the support device 84 in general. In an embodiment, the support device layers 84a, 84b form a matrix of SMA. For example, referring to FIG. 8, a schematic view of a matrix arrangement depicts that the first support device layer 84a may include matrix components aligned with the span S of an airfoil 62 and the second support device layer 84b may include matrix components aligned with the chord C of the airfoil 62. In an embodiment, each of the first and second support device layers 84a, 84b includes a matrix of first matrix components 98 and second matrix 99 components crossing the first matrix components 98. The first and second matrix components may be arranged orthogonally.

Figure 9:
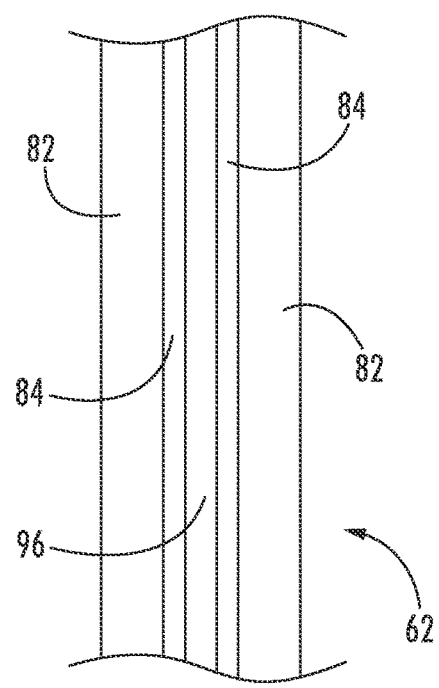
FIG. 9 is a schematic sectional view of the component of the airfoil of FIG. 7.

FIG. 9 depicts a schematic sectional view of the component of the airfoil 62 of FIG. 7 in an assembled configuration. The support device 84 shown in FIG. 9 may include SMA fibers that are embedded into a matrix composite. When a component such as the intermediate component 96 or the first and second support device layers 84a, 84b is a separate layer it can be bonded on to another portion of the fan blade 44 by a suitable process such as welding or brazing. The intermediate component 96 may inserted inside the fan blade 44 or created using additive manufacturing. It should be appreciated that the first and second support device layers 84a, 84b can be embedded into any suitable matrix composite such as a metal matrix or a ceramic matrix.

Figure 10:
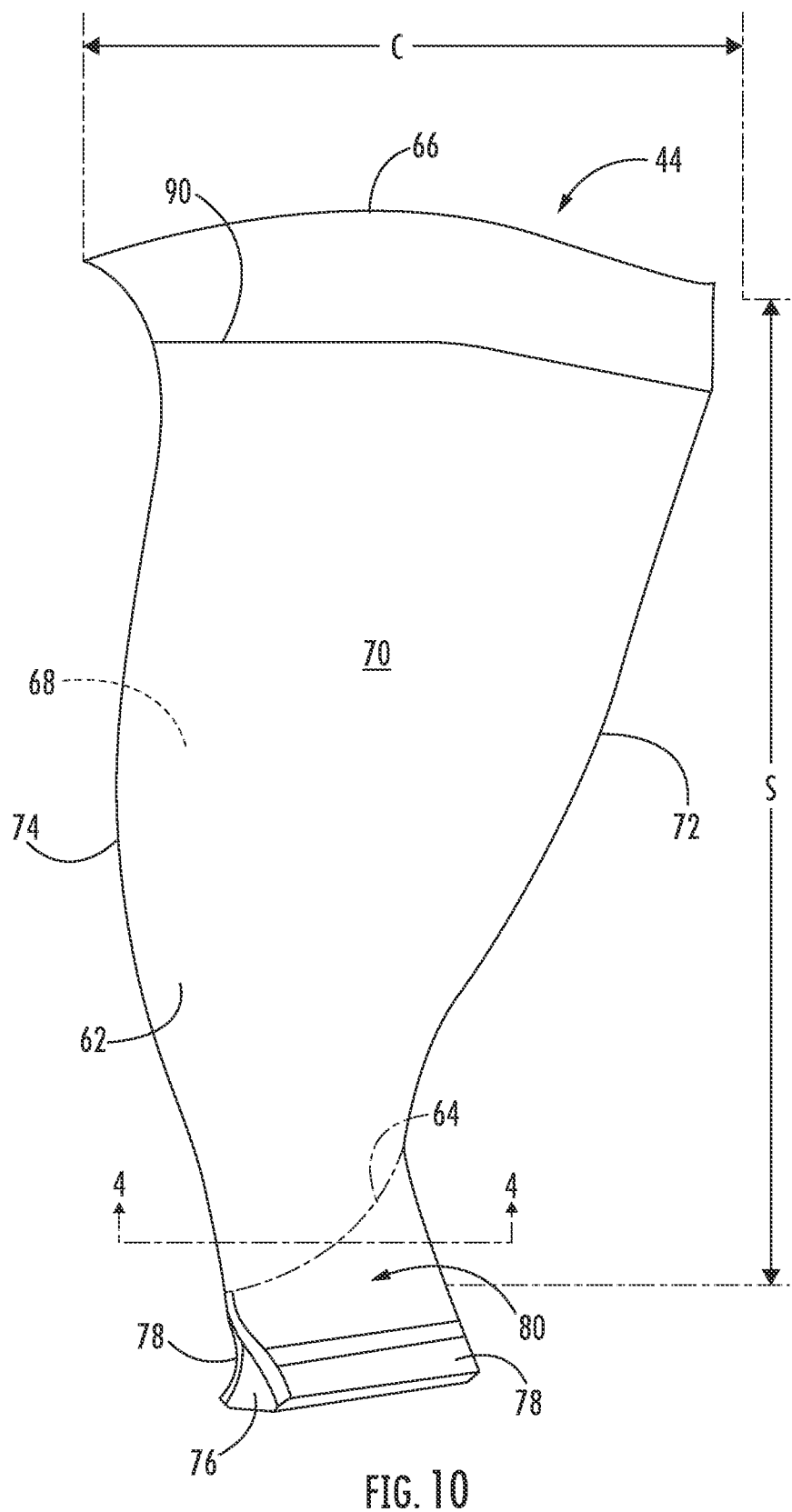
FIG. 10 is a perspective view of a fan blade for a gas turbine engine in a deformed state.

FIG. 10 depicts a deflected position of the fan blade 44 as shown in FIG. 3. As a consequence of the deflection, the span S of FIG. 10 is reduced in comparison to the fan blade shown in FIG. 3. When provided with a support device 84 as described herein, the reduction of the span S may be localized to a radially outer portion or a tip portion of the airfoil 62.

The gas turbine engine 10 may be provided with any of the features and elements as shown and described. The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

Further aspects are provided by the subject matter of the following clauses:

One aspect provides an airfoil rotatable about an axis to move air in an axial direction, the airfoil having a root portion having a root; a tip portion having a tip, the tip located opposite the root along a radial direction; a frangible portion disposed outward of the root portion along the radial direction; and a support device comprising a shape memory alloy, wherein the support device connects the root portion to the frangible portion and is movable between a baseline position and a deflected position.

Another aspect provides an airfoil having a first outer surface; a second outer surface opposite the first outer surface; and a support device formed of a shape memory alloy disposed between the first outer surface and the second outer surface, wherein the support device is movable between a baseline position and a deflected position.

One aspect provides an airfoil wherein the support device is formed completely of the shape memory alloy.

Another aspect provides an airfoil wherein the support device is disposed within the frangible portion.

Another aspect provides an airfoil wherein the support device is integral with the frangible portion.

Another aspect provides an airfoil wherein the support device comprises at least one folding portion configured to deform in the axial direction.

Another aspect provides an airfoil wherein the airfoil defines a span between the root and the tip, and wherein the at least one folding portion comprises a plurality of folding portions spaced apart along the span.

Another aspect provides an airfoil wherein the plurality of folding portions includes a first folding portion defining a first stiffness and a second folding portion defining a second stiffness and disposed between the root and the first folding portion, wherein the second stiffness is greater than the first stiffness.

Another aspect provides an airfoil wherein the airfoil defines a leading edge, a trailing edge, and a chord between the leading edge and trailing edge, wherein the first folding portion defines a first foldable width along the chord, wherein the second folding portion defines a second foldable width along the chord, and wherein the second foldable width is greater than the first foldable width.

Another aspect provides an airfoil wherein the at least one folding portion is configured as at least one recess in the support device.

Another aspect provides an airfoil wherein the at least one foldable portion comprises a plurality of foldable portions, and wherein each of the plurality of foldable portions comprises a pair of opposed recesses in the support device.

Another aspect provides an airfoil wherein the support device is enclosed within a shell formed at least in part by the first outer surface, the second outer surface, a leading edge surface connecting the first and second outer surfaces, and a trailing edge surface spaced apart from the leading edge surface and connecting the first and second outer surfaces.

Another aspect provides an airfoil wherein the support device is configured to: undergo a phase transformation to a martensite phase responsive to an external load; and return to an austenite phase responsive to relaxing of the external load.

Another aspect provides an airfoil further comprising a frangible portion substantially surrounding at least a portion of the support device, the frangible portion configured to permanently deform responsive to the external load.

Another aspect provides an airfoil wherein the support device is further configured with a transition temperature of at least one hundred degrees Celsius (100° C.).

Another aspect provides an airfoil further comprising a tip; a root portion; and a frangible tip portion disposed between the root portion and the tip, wherein the support device connects the root portion and the frangible tip portion.

Another aspect provides an airfoil further comprising an intermediate portion disposed between the root portion and the frangible tip portion, the intermediate portion formed of the shape memory alloy.

Another aspect provides an airfoil wherein the airfoil defines a span, and wherein a section of the support device extends over at least fifty percent (50%) of the span.

Another aspect provides an airfoil, wherein the airfoil defies a chord, and wherein a section of the support device extends over at least fifty percent (50%) of the chord.

Another aspect provides an airfoil, wherein the support device is configured to regulate a mass release event of the frangible tip portion.

We claim:

1. An airfoil rotatable about an axis to move air in an axial direction, the airfoil comprising:
   a root portion having a root;
   a tip portion having a tip, the tip located opposite the root along a radial direction;
   a frangible portion disposed outward of the root portion along the radial direction; and
   a support device comprising a shape memory alloy, wherein the support device connects the root portion to the frangible portion and is movable between a baseline position and a deflected position, wherein the support device is configured to undergo a phase transformation to a martensite phase responsive to an external mechanical load, and return to an austenite phase responsive to relaxing of the external mechanical load.

2. The airfoil of claim 1, wherein the support device is formed completely of the shape memory alloy.

3. The airfoil of claim 1, wherein the support device is disposed within the frangible portion.

4. The airfoil of claim 3, wherein the support device is integral with the frangible portion.

5. The airfoil of claim 1, wherein the support device comprises at least one folding portion configured to deform in the axial direction.

6. The airfoil of claim 5, wherein the airfoil defines a span between the root and the tip, and wherein the at least one folding portion comprises a plurality of folding portions spaced apart along the span.

7. The airfoil of claim 6, wherein the plurality of folding portions includes a first folding portion defining a first stiffness and a second folding portion defining a second stiffness and disposed between the root and the first folding portion, wherein the second stiffness is greater than the first stiffness.

8. The airfoil of claim 7, wherein the airfoil defines a leading edge, a trailing edge, and a chord between the leading edge and trailing edge, wherein the first folding portion defines a first foldable width along the chord, wherein the second folding portion defines a second foldable width along the chord, and wherein the second foldable width is greater than the first foldable width.

9. The airfoil of claim 5, wherein the at least one folding portion is configured as at least one recess in the support device.

10. The airfoil of claim 9, wherein the at least one foldable portion comprises a plurality of foldable portions, and wherein each of the plurality of foldable portions comprises a pair of opposed recesses in the support device.

11. An airfoil comprising:
    a first outer surface;
    a second outer surface opposite the first outer surface; and
    a support device formed of a shape memory alloy disposed between the first outer surface and the second outer surface, wherein the support device is movable between a baseline position and a deflected position, wherein the support device is configured to undergo a phase transformation to a martensite phase responsive to an external mechanical load, and return to an austenite phase responsive to relaxing of the external mechanical load.

12. The airfoil of claim 11, wherein the support device is enclosed within a shell formed at least in part by the first outer surface, the second outer surface, a leading edge surface connecting the first and second outer surfaces, and a trailing edge surface spaced apart from the leading edge surface and connecting the first and second outer surfaces.

13. The airfoil of claim 11, further comprising a frangible portion substantially surrounding at least a portion of the support device, the frangible portion configured to permanently deform responsive to the external load.

14. The airfoil of claim 11, wherein the support device is further configured with a transition temperature of at least one hundred degrees Celsius (100° C.).

15. The airfoil of claim 11, further comprising:
a tip;
a root portion; and
a frangible tip portion disposed between the root portion and the tip, wherein the support device connects the root portion and the frangible tip portion.

16. The airfoil of claim 15, further comprising an intermediate portion disposed between the root portion and the frangible tip portion, the intermediate portion formed of the shape memory alloy.

17. The airfoil of claim 15, wherein the airfoil defines a span, and wherein a section of the support device extends over at least fifty percent (50%) of the span.

18. The airfoil of claim 15, wherein the airfoil defines a chord, and wherein a section of the support device extends over at least fifty percent (50%) of the chord.

19. The airfoil of claim 15, wherein the support device is configured to regulate a mass release event of the frangible tip portion.

* * * * *